United States Patent [19]

Soulat

[11] 4,070,809
[45] Jan. 31, 1978

[54] AUTOMATIC SUGAR CANE HARVESTING MACHINE

[75] Inventor: Rene Soulat, Paris, France

[73] Assignee: Sodia S.A., Paris, France

[21] Appl. No.: 605,044

[22] Filed: Aug. 15, 1975

[30] Foreign Application Priority Data

Aug. 23, 1974  France ............................. 74 28942

[51] Int. Cl.$^2$ ............................................. A01D 45/10
[52] U.S. Cl. ........................................ 56/13.9; 56/502
[58] Field of Search ............. 56/12.8, 13.3, 13.5–13.9, 56/14.3, 14.5, 500, 503, 502, 208

[56] References Cited

U.S. PATENT DOCUMENTS

| | | | |
|---|---|---|---|
| 1,054,256 | 2/1913 | Taylor | 56/53 X |
| 2,541,777 | 2/1951 | Murray | 56/255 X |
| 3,325,982 | 6/1967 | Fogels et al. | 56/11.2 |
| 3,434,271 | 3/1969 | Gaunt et al. | 56/60 |
| 3,599,404 | 8/1971 | Fernandez et al. | 56/12.8 |
| 3,673,774 | 7/1972 | Mizzi | 56/13.9 |

*Primary Examiner*—Russell R. Kinsey
*Attorney, Agent, or Firm*—Finnegan, Henderson, Farabow & Garrett

[57] ABSTRACT

A machine for harvesting sugar cane runs on a pair of driving wheels and a pair of guide wheels. At the front of the machine there is arranged a pair of arms, the ends of which rest on the ground and on which are mounted a pair of rotating conical members which lift the sugar cane which is then cut near its base by a pair of rotating cutters, the height of which above the ground is controlled by said pair of arms. The cut stems are then sliced into pieces by blades mounted on a rotating drum which blades cooperate with bars mounted on a second rotating drum. The cut pieces of cane, together with waste lighter elements are then projected towards an elevator through an air flow from a nozzle which carries away the waste and allows the cane to reach the elevator.

32 Claims, 7 Drawing Figures

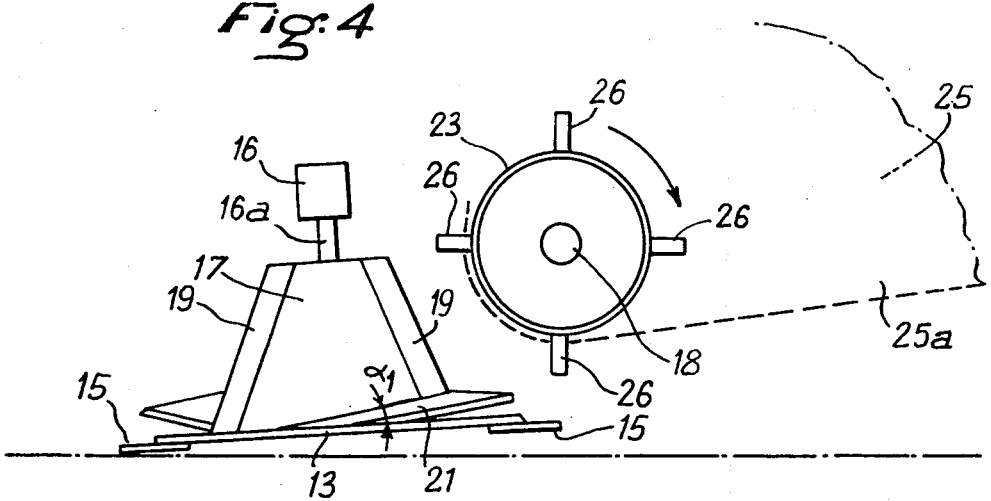
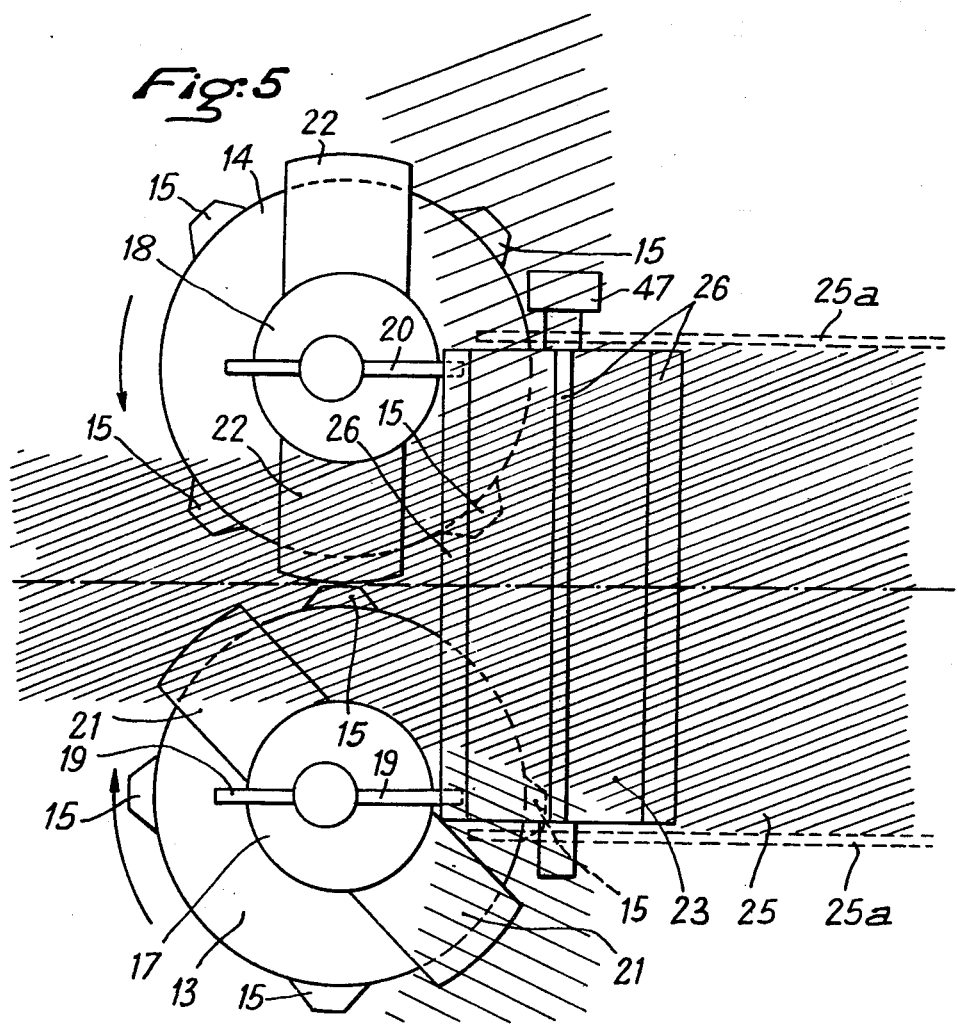

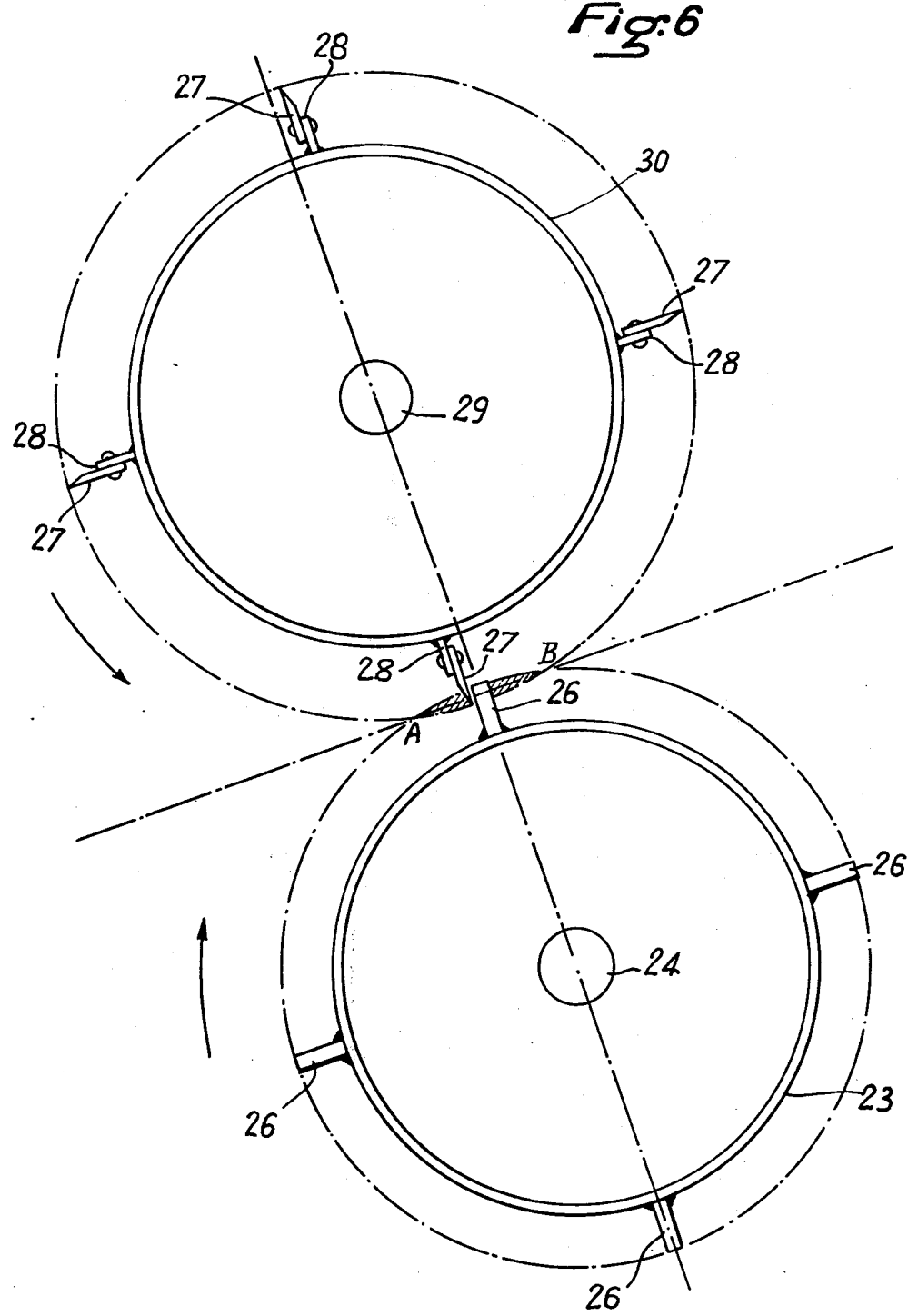

AUTOMATIC SUGAR CANE HARVESTING MACHINE

BACKGROUND OF THE INVENTION

1. Field of the Invention

The present invention relates to a machine for harvesting sugar cane stems.

2. Description of the Prior Art

In order to harvest sugar cane stems it is necessary first to cut them at the base and then feed them into a machine in which the stems are cut up into a number of small sections approximately 30 cm in length, to proceed then to a sorting process designed to eliminate bits of white ends and pieces of cut up leaves and to evacuate the sections thus cut and sorted to a loading mechanism. Numerous automatic machines exist which effect these operations but their results are not satisfactory.

Firstly, the tools for cutting the bases of the stems are not satisfactory; their working height above the ground is regulated by a control system which is actuated by the driver who needs to pay great attention and display much skill not to cut too high and to avoid digging the cutter into the ground because of unevenness in the terrain. Secondly, when the driver tries to cut as low as possible he is unable to avoid stones or mounds of earth projecting into the machine. Thirdly, the cutting tools used to slice up the stems make angled cuts exposing too great an area to the air which causes inversion of the sucrose and fourthly, the sorting means used are very lengthy, bulky and often inefficient which results in very heavy and expensive machines.

SUMMARY OF THE INVENTION

The object of the present invention is to eliminate these disadvantages.

The present invention relates to an automatic sugar cane harvesting machine, comprising:

a device for the suspension of the machine and the cutting tool and for the regulation of the height above the ground of said cutting tool;

a cutting device which enables the sugar cane stems to be laid flat and raised by the base to the input point of the machine while eliminating stones, pebbles, clods of earth and other foreign bodies;

a device for raising the stems to be cut and throwing the cut section backwards;

a device for the sorting and removing of the sugar cane stem sections and the white end sections and the cut leaves.

BRIEF DESCRIPTION OF THE DRAWINGS

As an illustration and in order to facilitate the understanding of the invention, the appended drawings show:

FIG. 4: a large scale detail view in lateral elevation illustrating the cutting tool;

FIG. 5: a plan view of the device of FIG. 4;

FIG. 6: a large scale detail view in lateral elevation illustrating the slicing tool;

DETAILED DESCRIPTION OF THE PREFERRED EMBODIMENT

Figure 1:
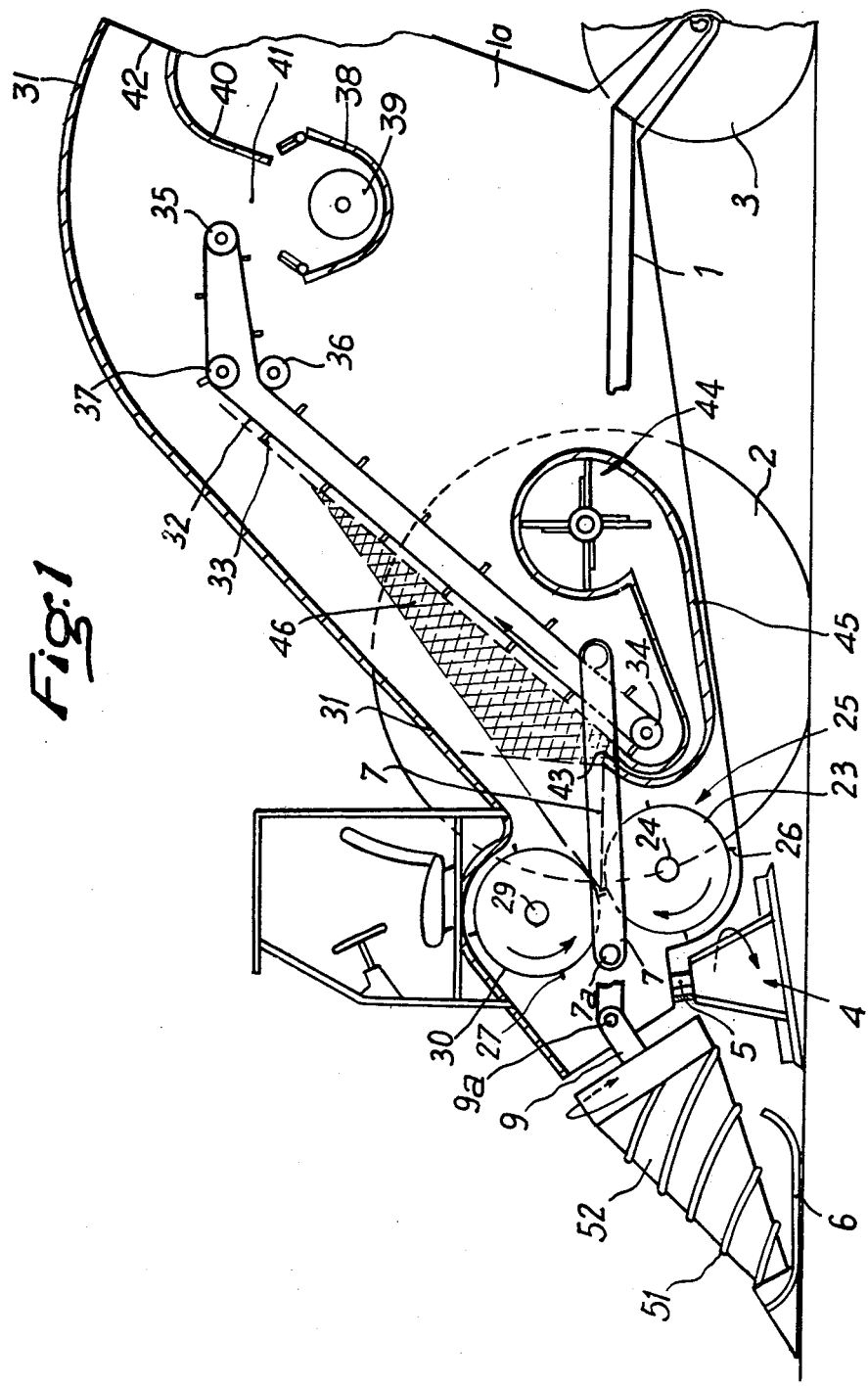
FIG. 1: a schematic view in elevation with a partial section of an embodiment of a machine according to the invention.
Figure 2:
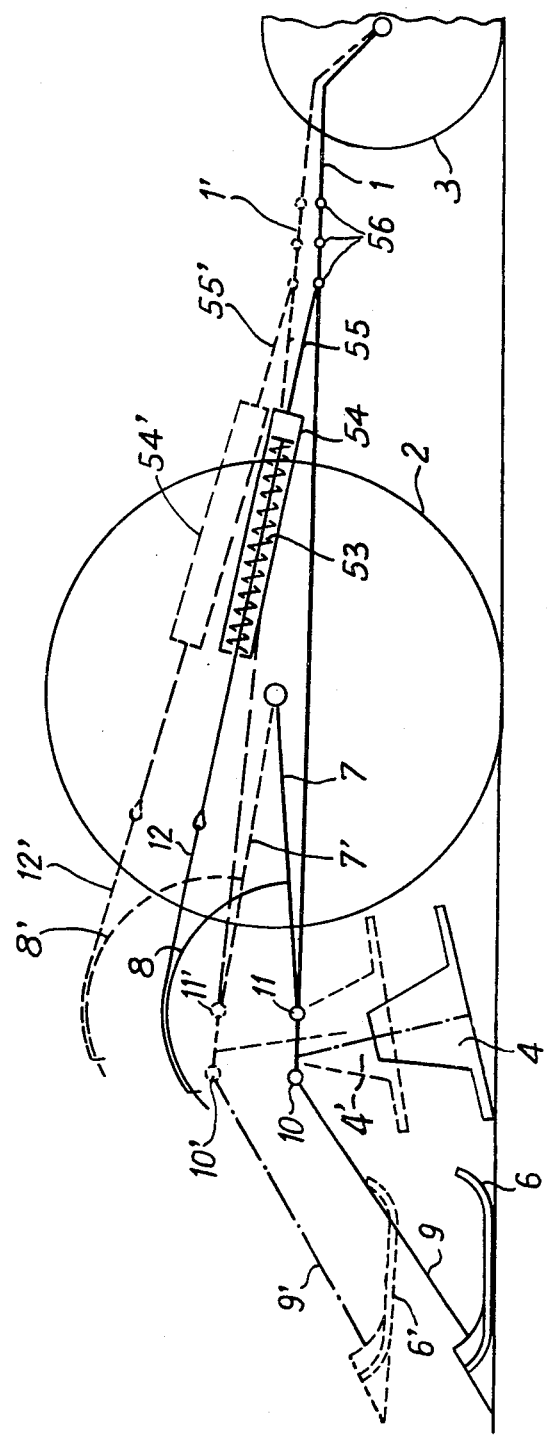
FIG. 2: a schematic view showing the weight compensation device.
Figure 3:
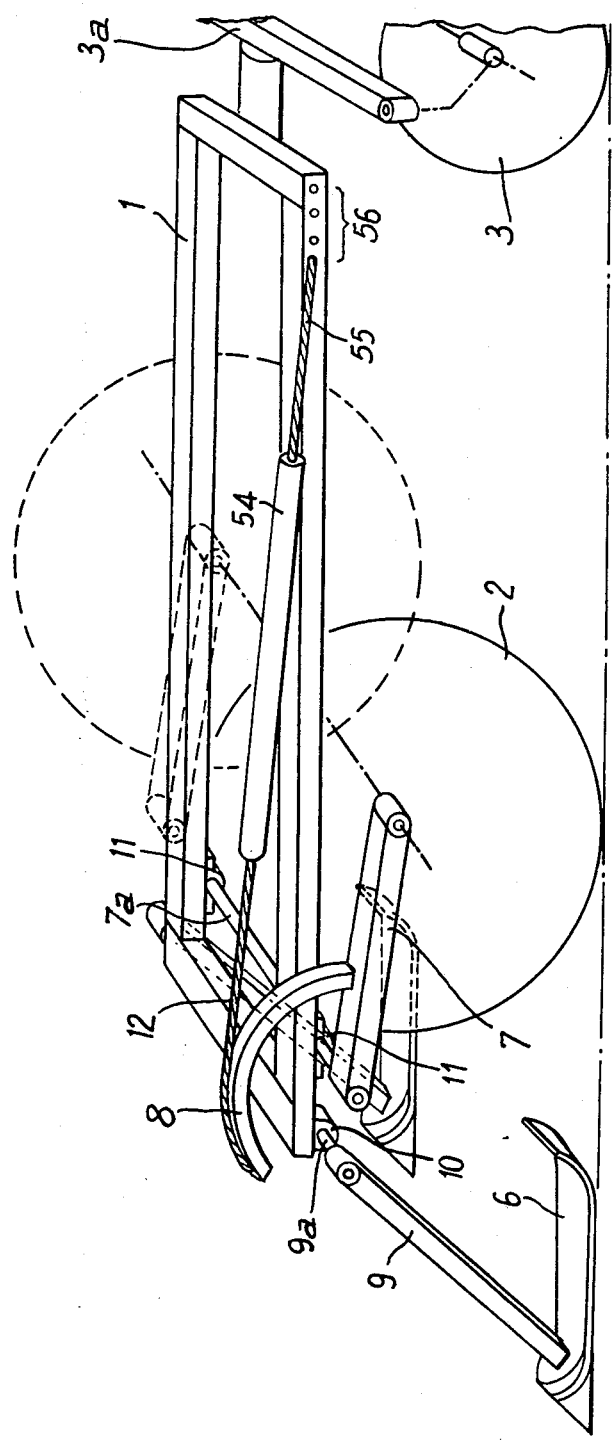
FIG. 3: a schematic view in perspective showing the basic components of the cutting tool height regulation device, the other components of the machine having been omitted in order to make the illustration clearer.

With reference to the drawings and more particularly FIGS. 1, 2 and 3, it can be seen that the machine consists of a frame 1, which supports a casing 1a in which are located all the machine's mechanisms, such as the drive motor, the slicing and sorting mechanism and others which are described hereinafter.

The frame 1 is supported on two guide wheels 3 which are situated at the rear of the machine, relative to the direction of forward motion thereof; the mechanism which permits the steering of the wheels is not shown, as it is known and does not form part of the present invention. The forward portion of the frame is articulated by bearings 11, as shown in FIG. 3, to a U-shaped compensator formed by two parallel arms 7 linked to one another by a cross member 7a which is at right angles to the longitudinal axis of the machine. At their two rear ends the arms 7 are articulated on the axles of the driving wheels 2. The two arms 7 point obliquely backwards in such a way that the angle which they make with the frame 1 is open towards the rear.

In front of the bearings 11 by which the frame 1 supports the cross member 7a a second compensator is located, also U-shaped, which is formed by two parallel arms 9 linked to one another by a cross member 9a which is parallel to cross member 7a. The lower ends of the arms 9 are fitted with skids 6. The cross member 9a is fixed to the frame 1 by locking devices 10, enabling it to be locked on the frame in such a way that it cannot pivot, which immobilises the arms 9 at a set angle relative to the frame 1.

The frame 1 also carries a support 5, as shown in FIG. 1, for a cutting tool 4, which is situated just behind the skids 6.

The arms 9 are each fitted with a conical member 52 mounted so as to be able to rotate on the corresponding arm 9; these conical members have spiral ribs 51 along their surfaces. The two conical members 52 rotate in opposite directions so as to lift up plant material which comes between them as the machine advances. The means of driving the conical lifters 52 are not described because they do not form part of the invention and can be easily devised by any person skilled in the art; they can advantageously be constituted by hydraulic motors.

FIGS. 2 and 3 illustrate schematically on the one hand the means of balancing the various moving parts and on the other hand the relative movements of the said parts.

When the skid 6 rises, having encountered an irregularity in the ground, and reaches the position shown by dotted lines in FIG. 2 and marked 6', it moves the arms 9 which then move to position 9'. As the arms 9 are integral with the frame 1, the latter swings into position 1' and the cutting tools are in position 4', the compensator 7 pivoting in the bearings 11 to position 7'. The frame 1 and the compensator 7–7a are fitted with balancing equipment. This equipment may be a hydraulic jack, jointed to the frame 1 and to the arms 7 (or only to one of the arms), the hydraulic supply to this jack being controlled by a distributor actuated by a connecting rod the displacement of which is linked to the variations of the angle made by the arms 7 in relation to the frame 1.

This compensation equipment can to advantage form a proper suspension system as shown in FIGS. 2 and 3. In this case, each arm 7 of the compensator 7–7a is fitted with a curved lever 8 over a portion of which a cable 12 is wrapped, cable 12 being connected to a compression spring 53, arranged in a tube 54, which by means of a cable 55 is connected to the frame 1. The cable 55 can be fixed at several points 56 on the frame 1 in order to balance the unit.

It is also possible to fix the point 56 at the end of a mechanism controlled by the driver of the machine in such a way that it is possible to move back at will the point 56 on the one hand in order to obtain as perfect as possible a balancing and on the other hand to cause at will the lifting of the frame 1, of the arm 9 and of the cutting tools 4, the machine being thus in the transport position. It should also be noted that the compensation means described above perform the function of bringing back the load onto the driving wheels 2 which increases their adhesion.

In the example shown, the arms 9 are resting on the ground by means of skates 6, but it is evident that the skates 6 can be replaced by carrier wheels.

Below the lifters 52 there is arranged a cutting tool which is designated by the reference number 4 on FIG. 1 and is not shown in FIG. 3 so as to simplify this figure. The cutting tool 4 is shown in detail on a larger scale in FIGS. 4 and 5. By referring to FIGS. 4 and 5 it can be seen that the cutting tool consists of two rotating discs 13 and 14, rotating in opposite directions in order to draw the sugar cane stems between them. The two discs 13 and 14 are provided at their peripheries with four sharp blades 15 which are spaced 90° from one another. These two discs 13 and 14 are fixed at the bases of two cones 17 and 18 fitted to shafts 16a powered by any suitable means, for example by hydraulic motors 16, these shafts being protected by a housing to insulate them from any contact with the plant material. These cones 17 and 18 are provided along the generatrices with bars 19 and 20. At the base of the cones 17 and 18, above the discs 13 and 14, are located paddles 21 and 22 whose sweep is at a negative angle of attack. In the example shown, the paths of the blades 15 of the two rotors are almost tangent circles, however, these circles can overlap provided the two rotors are synchronised and the blades 15 are staggered in relation to one another. Behind the two rotors thus described there is located a cylindrical drum 23 the axis 24 of which is horizontal. This drum rotates such that its lower portion advances in the direction of forward motion of the machine and is driven by any suitable means, for example by a hydraulic motor 47.

This drum 23 is positioned at the entrance of the feed channel 25 of the machine, this channel 25 being defined by lateral partitions 25a. Along four generatrices of the cylinder the drum is provided with bars 26.

The two cutting rotors shown in FIGS. 4 and 5 are connected to the casing 1a by direct fixing onto the chassis of their drive mechanism, in such a way that these two rotors and the drum 23 occupy, relative to the said casing 1 and in particular relative to the feed channel 25, a constant position, regardless of the oscillations of the whole unit. Preferably, the axis 24 of the drum 23 should be situated at the height of the tops of the rotors 17 and 18 and directly above the rear extremity of the discs 13 and 14. In addition, the diameter of the drum 23 is such so as to leave a minimum free space between the bars 26 of the drum and the bars 19 and 20 of the rotors roughly as wide as the said bars.

The contour of the front end of the walls 25a of the channel 25 fits the contour of the lower front edge of the drum 23. The result of this arrangement is to leave open at the sides the channel 25 at the level where the drum 23 is in danger of receiving stones or pebbles and it thus permits the discharge to the side of foreign bodies bouncing between the rotors 13, 14 and the drum 23.

The drum 23 acts both as a device for drawing in the material and as one of the two components forming a device intended to grip and slice into small sections the sugar cane stems cut by the blades 15. As shown in FIG. 6, the drum 23 is associated with another drum 30 which, in the example shown, is of the same diameter, rotating in the opposite direction at the same speed. The drum 30 is also located inside the feed channel 25 and is positioned above the drum 23, its horizontal axis 29 being slightly forward relative to the axis 24 of the drum 23. The drum 30 is not shown in FIG. 4 for reasons of simplicity.

As shown in FIG. 6, the drum 30 is provided along four generatrices with sharp blades 27 of a number equal to the bars 26 of the drum 23, these blades being located on supports 28. The circular paths of the extremities of the bars 26 and the blades 27 overlap, according to a double lens-shaped sector shown in broken lines in FIG. 6 and defined by points A and B. The initial setting of the drums 23 and 30 is such that each front face of the blades 27 slides along the rear face of the corresponding bar 26. Preferably, the blades 27 and the bars 26 should be slightly inclined in relation to the walls of their cylinders so that the front face of the blades 27 and the rear face of the bars 26 are parallel and slightly staggered in relation to one another at point A where their respective paths intersect. The effect of the forward disposition of the drum 30 is that the straight line AB is oblique and points upwards making an angle of approximately 30° with the horizontal.

In the example shown, the drums 23 and 30 have the same diameter, the same number of blades or bars and the same speed, but it is possible to vary the diameters and the number of blades or bars by determining the synchronisation of the said rotors so that each blade 27 slides along a bar 26. Thus the two drums can have equal diameters, the number of blades 27 being an integar multiple of the number of bars and in this case the speed of rotation of the drum 30 must be multiplied by the same multiple relative to that of drum 23. Alternatively, the diameters can be different but the circumferences of the drums and the number of the blades or bars, i.e., the distance between the blades of the bars must be a multiple one of the other, their speed being in the same ratio.

Returning to FIG. 1, it can be seen that the feed channel 25 opens into an area defined by a hood 31 and an elevator apron 32 having bars 33. At its base this apron wraps around a roller 34 and at the top around a drive roller 35 and has two intermediate rollers 36 and 37. Rollers 34–37 are suitably pivotally connected to support structure carried by frame 1 and not shown. The active run of the belt rises from roller 34 to roller 37 in a straight line at an angle of approx. 60° to the horizontal then it moves in a more or less horizontal direction from roller 37 to roller 35; the return run of the belt is guided by roller 36 and driven by drive roller 35 which can be moved horizontally. The means of driving the drive roller 35 and the elevator apron are not described because they do not form part of the invention and can be constructed easily by any skilled man. Such means can comprise a hydraulic motor. The hood 31 is spaced from the apron 32 and inclines towards apron 32 in a direction from adjacent the lower end of apron 32 to roller 37. Underneath the upper end of the apron 32, i.e. underneath the roller 35 there is located a transverse chute 38 at the base of which there is an endless screw 39 for discharge of plant material from the machine.

A hood member 40, located rearwardly of roller 35 and below a rearward extension of the hood 31 defines with said roller an opening 41 vertically above the chute 38 and defines with said hood a discharge orifice 42 situated at the rear of the machine.

At the base of the elevator apron 32 is located the outlet nozzle of a fan 44. In the example shown, the fan 44 is situated under the apron 32 and its outlet pipe 45 winds around the base of the said apron and opens out into 43. The nozzle 43 is arranged slightly obliquely so that the jet of air expelled assumes the form of a dihedron of which one side is parallel to the apron 32 and located just above the end of the bars 33, and the other side hits the hood 31 a little to the rear of the rear end of the feed channel 25.

The machine thus described works as follows.

Under the action of the driving wheels 2 and steered by the guide wheels 3 the machine moves forward in such a way that the mean axis of a line of sugar cane stems is in the median axis of the cutting tool 4. When the skids 6 rise in response to an irregularity in the terrain, they raise the casing 1a, i.e. the whole of the machine, by means of the compensators 9 and this movement is facilitated by the compensation and balancing mechanism which connects the compensator 7 to the frame 1. The entire machine assembly pivots about the points of contact of the wheels 3 with the ground. The wheels 2 move slightly forward or backward in relation to the wheels 3. The result is that the relative positions of the cutting tool 4, the slicing drums 23 and 30 of the channel 25 and of the elevator apron 32 remain unchanged. The conical elevators 52 and their spiral projections 51 raise the mass of vegetation which may be more or less flat.

The blades 15 of the rotating discs 13 and 14 sever the bases of the sugar cane stems and the combined action of the bars 19, 20 and of the paddles 21, 22 brings about a backwards and upwards movement of the said stem bases and which results in their lying progressively forwards. The blades 15 work as closely as possible to the ground, and so it happens that pebbles, stones, clods of earth or other foreign bodies are caught by these blades. In this case they are thrown backwards by the bars 19, 20 and are ejected to the side, either directly or after rebounding several times between the bars 19, 20 and the bars 26 of the drum 23. The sugar cane stem bases, which, as stated above, are drawn backwards and upward by the combined action of the bars 19, 20 and the paddles 21, 22 are then caught by the bars 26 of the drum 23 and pulled between the said drum 23 and the drum 30. There they are sliced by the blades 27 pressing against the upper faces of the bars 26 which permits a clean cut virtually perpendicularly to the stem.

Figure 7:
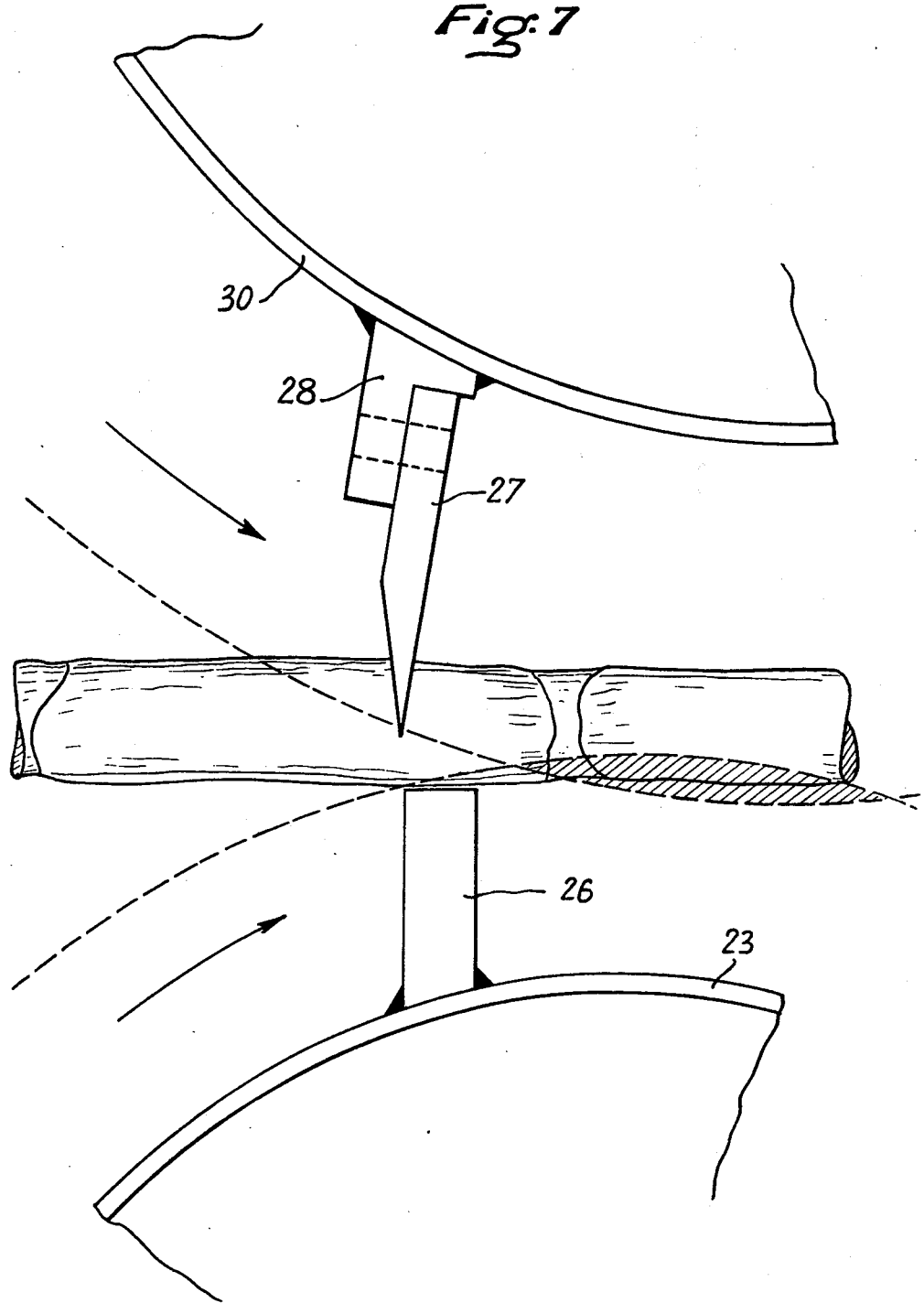
FIG. 7: a large scale detail view in lateral elevation illustrating the combined action of a blade and a support bar on a sugar cane stem.

Because of the speed of rotation of the drums 23 and 30 and the inclination of the line AB (FIGS. 6 and 7) the stem sections thus cut are thrown back violently in a dihedral bissected by the line AB. The inclination of the straight line AB is determined by adjusting the position of the axis 29 in relation to axis 24, so that the lower plane of the dihedral is practically horizontal and the inclination of the apron 32 is determined as a function of the angle of opening of the dihedral so that the intersection between the upper plane of the said dihedral and the said apron is located about four-fifths of the distance upwards along the apron.

Before reaching the elevator apron 32 the sections of stem thrown out by the drums 23 and 30 are subject to the action of the air flow discharged by the nozzle 43. In this way their paths cut across the path of the air flow, in accordance with the area 46 marked by dashes which extends for four-fifths of the length of the upwards course of the apron and which is of constantly diminishing thickness. The result is that only the heavy elements, i.e., the stem sections to be kept, will pass the obstacle which the air flow created by the fan 44 represents, to reach the active side of the belt of the apron 32, while the lighter elements, such as waste from weeds, leaves and white ends, will be carried away by the air flow towards the wall 31. The heavy elements which reach the elevator apron 32 are taken by the bars 33 and conveyed to the roller 35 from where they fall and by passing through the orifice 41, they enter the chute 38 from which they are removed by the endless screw 39 to a truck or similar moving over the ground in the same direction as the machine laterally on the left or right. The light elements are carried away by the air flow along the hood 31 to the orifice 42 through which they exit from the machine and fall to the ground.

The duct formed by the hood 31 and the apron 32 forms a narrow neck at the level of the elbow made by the apron on the roller 37; this narrow neck acts in a manner similar to a Venturi, which brings about an increase in the speed of the air flow at the narrow neck and a depression at that point. This aerodynamic effect increases the effectiveness of the sorting obtained. Because the air flow runs almost tangentially to the elevator which makes an angle of 60° with the horizontal and because the jet of material projected makes an angle of approximately 30° with the horizontal, there is an angle of only 30° between these two currents, which means that the sorting area shown in dashes is very large and this permits excellent results to be obtained in the sorting operation.

In addition, although not shown in FIG. 1, as it is in itself known, the machine can include a cutting device above the elevators 52 designed to cut the white ends or at least a large part of the white ends and to throw them to the side.

I claim:

1. A machine for harvesting sugar cane comprising:
   a machine frame,
   a cutting device carried by said frame for cutting the bases of the sugar cane stems,
   means carried by said frame for adjusting the working height of said cutting device relative to ground level and maintaining constant the position of said cutting device relative to said machine frame thereby adapting the machine for use over irregular ground surfaces;
   means carried by said frame for slicing the cut sugar cane stems into small sections; and
   means carried by said frame for sorting the various parts of the sugar cane stems and plant material and discarding specified portions of said parts,
   front and rear pairs of wheels for supporting said frame;

a first compensator comprising a pair of substantially parallel arms each pivotally joined at its forward end to said frame and extending longitudinally rearwardly of said machine, said arms rotatably carrying the front pair of wheels at their respective opposite ends and forming rearwardly opening acute angles with said frame, a second compensator including a pair of parallel arms each pivotally joined at its rearward end to said frame and extending longitudinally forwardly of the machine for resting on the ground, and means for locking said second compensator arms at predetermined forwardly opening obtuse angles relative to said frame.

2. A machine according to claim 1 wherein said first compensator includes a cross member articulated to said frame and extending laterally of the longitudinal extent of the machine, the forward ends of the first compensator arms being rigidly joined to said cross member, said second compensator including a cross member extending laterally of the longitudinal extent of the machine, the rearward ends of said second compensator arms being rigidly joined to said second compensator cross arm.

3. A machine according to claim 1 including skids disposed on the forwardmost ends of the second compensator arms for engagement with the ground.

4. A machine according to claim 3 including balancing means linking said frame and said first compensator one to the other to substantially compensate for the weight of said frame and said cutting device.

5. A machine according to claim 4 in which said balancing means comprises a curved member carried by said first compensator, a cable attached to and disposed about said member and a spring fixed at opposite ends to said frame and said cable.

6. A machine according to claim 5 including means for attaching said one spring end to said frame at a plurality of positions therealong to vary the tension of said spring and the balance effected thereby.

7. A machine according to claim 4 wherein said balancing means comprises a distributor and a hydraulic jack controlled by the said distributor, and means responsive to the variations in the acute angles formed by said frame and said first compensator arms for actuating said distributor.

8. A device according to claim 4 including means for transferring load onto said front wheels to increase their adhesion.

9. A machine for harvesting sugar cane comprising:
a machine frame,
a cutting device carried by said frame for cutting the bases of the sugar cane stems,
means carried by said frame for adjusting the working height of said cutting device relative to ground level and maintaining constant the position of said cutting device relative to said machine frame thereby adapting the machine for use over irregular ground surfaces;
means carried by said frame for slicing the cut sugar cane stems into small sections;
means carried by said frame for sorting the various parts of the sugar cane stems and plant material and discarding specified portions of said parts,
said cutting device including a pair of side-by-side substantially conically shaped rotors having rotational axes inclined forwardly, means for rotating said rotors in opposite directions for drawing in cut plant material therebetween, each rotor including an element disposed along its conical surface for driving material between said rotors, knife blades carried adjacent the bases of said rotors, each blade being disposed in a plane at right angles to the rotor's axis of rotation, and a flight carried by each rotor adjacent its base and above the knife blade for lifting material flowing between said rotors.

10. A machine according to claim 9 including a cylindrical drum carried by said frame for rotation about a generally horizontal axis and being located behind said rotors, a plurality of bars disposed along the surface of said drum, means for rotating said drum such that its lower side advances forwardly relative to the forward motion of the machine, the axis of said drum having an elevation substantially the same as the elevation of the highest point of the conical surface of said rotors and substantially vertically above the rearmost extent of said rotating knife blades, said drum having a diameter forming a minimum free space approximately the width of said bars between the tips of said bars of said drum and said rotors.

11. A machine according to claim 10 including means defining a feed channel having lateral walls, said drum being located between the front lateral walls of said feed channel, said lateral walls having arcuate forward edges substantially corresponding to the contour of the drum surface such that said channel opens at its opposite sides into the space between said rotors and said drum enabling ejection of foreign materials to the sides of said machine.

12. A machine for harvesting sugar cane comprising:
a machine frame,
a cutting device carried by said frame for cutting the bases of the sugar cane stems,
means carried by said frame for adjusting the working height of said cutting device relative to ground level and maintaining constant the position of said cutting device relative to said machine frame thereby adapting the machine for use over irregular ground surfaces;
means carried by said frame for slicing the cut sugar cane stems into small section;
means carried by said frame for sorting the various parts of the sugar cane stems and plant material and discarding specified portions of said parts,
slicing means including two rotating cylindrical drums having horizontal axes and disposed one above the other, means carried by said frame for rotating said drums in opposite directions, the upper drum having cutting blades with edges generally parallel to its axis, the lower drum having an equal or integer multiple number of outwardly projecting support bars, the circular paths of the extremities of said bars and said blades intersecting and defining an intersection zone extending from the point of initial intersection of the circular paths of the extremities of said blades and said bars to the point of last intersection of the circular paths of the extremities of said blades and bars in the direction of their travel, said two drums being synchronized such that a face of each of said blade slides along the opposite face of a corresponding bar when said blades and bars are disposed in said intersection zone.

13. A machine according to claim 12 wherein said drums are synchronized such that the leading face of each said blade slides along the trailing face of a corresponding bar when said blades and bars are disposed in said intersection zone.

14. A machine according to claim 12 in which said two drums have the same diameter, the same number of blades and bars, and the same speed of rotation.

15. A machine according to claim 12 wherein said two drums have equal diameters, the numbers of blades and bars being an integer multiple of one another with the speeds of rotation of said drums being in the same ratio.

16. A machine according to claim 12 wherein the circumference and the number of blades and bars arranged on said drums being a multiple one of the other with their speeds of rotation being in the same ratio.

17. A machine according to claim 12 wherein the front face of said blades and the rear face of said bars are substantially parallel and are slightly staggered relative to one another between said points of intersection.

18. A machine according to claim 12 wherein the axis of said zone of intersection of said two drums defined by a straight line between said two points is inclined upwards at an angle of approximately 30° to the horizontal.

19. A machine according to claim 12 wherein said lower drum grips the sugar cane stems and draws them into said zone of intersection to slice the stems and project them rearwardly along a dihedral path which is bisected by the axis of said intersection zone.

20. A machine according to claim 12 including means defining a feed channel in advance of said sorting means and having an entrance disposed rearwardly of said drums, said sorting means including a channel for receiving the sections cut off by said slicing means, said sorting channel including a hood and an inclined elevator apron spaced from said hood, and means providing an air flow along said dihedral path.

21. A machine according to claim 20 wherein said air flow means is provided at the base of said elevator apron.

22. A machine for harvesting sugar cane comprising:
a machine frame,
a cutting device carried by said frame for cutting the bases of the sugar cane stems, said cutting device including a pair of side-by-side substantially conically shaped rotors having rotational axes inclined forwardly, means for rotating said rotors in opposite directions for drawing in cut plant material therebetween, each rotor including an element disposed along its conical surface for driving material between said rotors, knife blades carried adjacent the bases of said rotors, each blade being disposed in a plane at right angles to the rotor's axis of rotation, and a flight carried by each rotor adjacent its base and above the knife blade for lifting material flowing between said rotors,
means carried by said frame for slicing the cut sugar cane stems into small sections; and
means carried by said frame for sorting the various parts of the sugar cane stems and plant material and discarding specified portions of said parts.

23. A machine according to claim 22 wherein said element includes an outwardly projecting bar carried by each said rotor and extending along its conical surface and substantially between its upper and lower extremities.

24. A machine according to claim 22 including a cylindrical drum carried by said frame for rotation about a generally horizontal axis being located behind said rotors, a plurality of bars disposed along the surface of said drum, means for rotating said drum such that its lower side advances forwardly relative to the forward motion of the machine, the axis of said drum having an elevation substantially the same as the elevation of the highest point of the conical surface of said rotors and substantially vertically above the rearmost extent of said rotating knife blades, said drum having a diameter forming a minimum free space approximately the width of said bars between the tips of said bars of said drum and said rotors.

25. A machine according to claim 24 including means defining a feed channel having lateral walls, said drum being located between the front lateral walls of said feed channel, said lateral walls having arcuate forward edges substantially corresponding to the contour of the drum surface such that said channel opens at its opposite sides into the space between said rotors and said drum enabling ejection of foreign materials to the sides of said machine.

26. A machine according to claim 22 wherein said slicing means includes two rotating cylindrical drums having horizontal axes and disposed one above the other, means for rotating said drums in opposite directions, the upper drum having cutting blades with edges generally parallel to its axis, the lower drum having an equal or integer multiple number of outwardly projecting support bars, the circular paths of the extremities of said bars and said blades intersection and defining an intersection zone extending from the point of initial intersection of the circular paths of point of last intersection of the circular paths of the extremities of said blades and bars in the direction of their travel, said two drums being synchronized such that a face of each said blade slides along the opposite face of a corresponding bar when said blades and bars are disposed in said intersection zone.

27. A machine according to claim 26 wherein said drums are synchronized such that the leading face of each said blade slides along the trailing face of a corresponding bar when said blades and bars are disposed in said intersection zone.

28. A machine according to claim 24 including at least one outwardly projecting bar carried by each said rotor and extending along its conical surface and substantially between its upper and lower extremities, the bars of said rotors and the bars of said drum being cooperable one with the other to eject foreign material drawn between said rotors and located forwardly of said drum in said free space to the opposite sides of said machine.

29. A machine for harvesting sugar cane comprising:
a machine frame,
a cutting device carried by said frame for cutting the bases of the sugar cane stems, said cutting device including a pair of side-by-side substantially conically shaped rotors having rotational axes inclined forwardly, means for rotating said rotors in opposite directions for drawing in cut plant material therebetween, each rotor including an element disposed along its conical surface for driving material between said rotors, knife blades carried adjacent the bases of said rotors, each blade being disposed in a plane at right angles to the rotor's axis of rotation, at least one outwardly projecting bar carried by each said rotor and extending along its conical surface and substantially between its upper and lower extremities, a cylindrical drum carried by said frame for rotation about a generally horizontal axis and being located behind said rotors, a plurality of bars disposed along the surface of said drum, means carried by said frame for rotating said drum such that its lower side advances forwardly relative to the forward motion of the machine, the axis of said drum having an elevation substantially the same as the elevation of the highest point of the conical surface of said rotors and substantially vertically above the rearmost extent of said rotating knife blades, said drum having a diameter forming a minimum free space approximately the width of said bars between the tips of said bars of said drum and said rotors, the bars of said rotors and the bars of said drum being cooperable one with the other to eject foreign material drawn between said rotors and located forwardly of said drum in said free space to the opposite sides of said machine, means carried by said frame for slicing the cut sugar cane stems into small sections; and means carried by said frame for sorting the various parts of the sugar cane stems and plant material and discarding specified portions of said parts.

30. A machine according to claim 29 including means carried by said frame for adjusting the working height of said cutting device relative to ground level and maintaining constant the position of said cutting device relative to said machine frame thereby adapting the machine for use over irregular ground surfaces.

31. A machine according to claim 30 including front and rear pairs of wheels for supporting said frame, a first compensator comprising a pair of substantially parallel arms each pivotally joined at its forward end to said frame and extending longitudinally rearwardly of said machine, said arms rotatably carrying the front pair of wheels at their respective opposite ends and forming rearwardly opening acute angles with said frame, and balancing means linking said frame and said first compensator one to the other to substantially compensate for the weight of said frame and said cutting device.

32. A machine according to claim 29 wherein said slicing means includes a second rotatable cylindrical drum having a horizontal axis and disposed above the first mentioned drum, means for rotating said drums in opposite directions, the upper drum having cutting blades with edges generally parallel to its axis, the circular paths of the extremities of said bars and said blades intersecting and defining an intersection zone extending from the point of initial intersection of the circular paths of the extremities of said blades and said drum bars to the point of last intersection of the circular paths of the extremities of said blades and said drum bars in the direction of their travel, said two drums being synchronized such that a face of each said blade slides along the opposite face of a corresponding bar when said blades and drum bars are disposed in said intersection zone.

* * * * *